United States Patent
Clemenceau et al.

(10) Patent No.: US 8,566,033 B2
(45) Date of Patent: Oct. 22, 2013

(54) METHOD FOR DETERMINING THE POSITION OF A MOBILE BODY AT A GIVEN INSTANT AND FOR MONITORING THE INTEGRITY OF THE POSITION OF SAID MOBILE BODY

(75) Inventors: Pierre-Jérôme Clemenceau, Chabeuil (FR); Jacques Coatantiec, Fauconnieres (FR)

(73) Assignee: Thales, Neuilly sur Seine (FR)

( * ) Notice: Subject to any disclaimer, the term of this patent is extended or adjusted under 35 U.S.C. 154(b) by 7 days.

(21) Appl. No.: 13/381,357

(22) PCT Filed: May 28, 2010

(86) PCT No.: PCT/EP2010/057446
§ 371 (c)(1),
(2), (4) Date: May 15, 2012

(87) PCT Pub. No.: WO2011/000643
PCT Pub. Date: Jan. 6, 2011

(65) Prior Publication Data
US 2013/0030775 A1    Jan. 31, 2013

(30) Foreign Application Priority Data
Jun. 30, 2009 (FR) ..................... 09 03191

(51) Int. Cl.
*G01S 5/14* (2006.01)

(52) U.S. Cl.
USPC ........... 701/469; 701/471; 701/472; 701/500; 701/501

(58) Field of Classification Search
USPC ............... 701/3, 7, 10, 11, 14, 468, 469, 471, 701/472, 500, 501, 502, 507, 505
See application file for complete search history.

(56) References Cited

U.S. PATENT DOCUMENTS

| | | | |
|---|---|---|---|
| 6,516,272 B2 * | 2/2003 | Lin | 701/472 |
| 6,982,669 B2 * | 1/2006 | Coatantiec et al. | 342/357.62 |
| 7,219,013 B1 * | 5/2007 | Young et al. | 701/472 |
| 7,711,482 B2 | 5/2010 | Coatantiec | |
| 2003/0083792 A1 | 5/2003 | Anderson et al. | |
| 2007/0222674 A1 | 9/2007 | Tan et al. | |
| 2010/0004903 A1 | 1/2010 | Fargas et al. | |

FOREIGN PATENT DOCUMENTS

| | | | |
|---|---|---|---|
| WO | 2008/040658 A1 | 4/2008 | |
| WO | 2008/049800 A1 | 5/2008 | |

* cited by examiner

*Primary Examiner* — Richard Camby
(74) *Attorney, Agent, or Firm* — Baker Hostetler LLP

(57) ABSTRACT

A method for determining the position of a mobile body at a given instant and for monitoring the integrity of the position of said mobile body includes a step of determining a sustained position at the given instant by adding the integral of the hybrid speed between the preceding instant and the given instant to the position of the mobile body at the preceding instant; a step of determining the sustained protection radius associated with the sustained position by adding the integral of the hybrid speed protection radius between the preceding instant and the given instant to the position protection radius of the preceding instant; a step of determining a better position at the given instant, the better position being: when information from the first positioning device is available, the position associated with a better protection radius, the better protection radius being selected by comparing the intermediate protection radius with the sustained protection radius according to a predetermined selection criterion; and, when information from the intermediate positioning device is unavailable, the sustained position.

7 Claims, 2 Drawing Sheets

METHOD FOR DETERMINING THE POSITION OF A MOBILE BODY AT A GIVEN INSTANT AND FOR MONITORING THE INTEGRITY OF THE POSITION OF SAID MOBILE BODY

CROSS-REFERENCE TO RELATED APPLICATIONS

This application is a National Stage of International patent application PCT/EP2010/057446, filed on May 28, 2010, which claims priority to foreign French patent application No. FR0903191, filed on Jun. 30, 2009, the disclosures of which are incorporated by reference in their entirety.

FIELD OF INVENTION

The present invention relates to a method for determining the position of a mobile body and for monitoring the integrity of the position of said mobile body at a given instant t. The mobile body is typically an aircraft.

BACKGROUND

To quantify the integrity of a position measurement in applications such as aeronautical applications, where integrity is critical, use is made of a parameter called the "protection radius" RP of the position measurement. The protection radius corresponds to a maximum position error for a given probability of occurrence of error.

As visible in FIG. 1, the protection radius of a measurement P, for a predetermined probability of non-integrity, is an upper bound of the discrepancy between the calculated value Pmes and the real value Ptrue of the measured quantity, such that there is a lower probability than the predetermined probability of non-integrity that the real value differs from the calculated value by a distance greater than the protection radius without an alarm being triggered toward a navigation system. Stated otherwise, there is therefore a maximum probability, equal to the predetermined probability of non-integrity, that the measured value is outside of a circle, of radius equal to the protection radius around the true value.

Methods are known for determining the position of a mobile body and for monitoring the integrity of this position at a given instant t on the basis of signals originating from a constellation of visible satellites. A system implementing a method of this type is commonly called a GNSS system ("Global Navigation Satellite System").

In these methods, a satellite-based positioning receiver on board the mobile body provides information about the position of the mobile body obtained by triangulation on the basis of the signals emitted by the satellites visible from the mobile body. The information provided may be momentarily unavailable since the receiver must have direct view of a minimum of four satellites of the positioning system in order to be able to calculate a position. Said information is furthermore of variable precision, depending on the geometry of the constellation underlying the triangulation, and noisy since it relies on the reception of signals of very low levels originating from distant satellites having a low emission power. But it does not suffer from long-term drift, the positions of the satellites traveling on their orbits being known precisely over the long term. The noise and the errors may be related to satellite faults. The word "fault" is understood to mean an abnormal situation wherein the satellite emits signals which have the appearance of normal signals but which are abnormal and lead to position errors due, for example, to the satellite systems, to the receiver or to the propagation of the signal between the satellite emitter and the GNSS signals receiver.

The major limitation of methods of this type is lack of availability. The positions and the integrity calculations may be momentarily unavailable when the information dispatched by the satellites is unavailable. This is also valid when a satellite-based positioning receiver is equipped with a precision and availability estimation system termed RAIM (standing for "Receiver Autonomous Integrity Monitoring") able to detect anomalies and to inform the user thereof, and with an FDE ("Fault Detection Exclusion") system instantaneously excluding the faulty satellite. These devices make it possible to instantaneously decrease the error in the subsequently calculated positions. One speaks of "snapshot" processes.

So-called non-augmented INS/GNSS hybrid methods are known which mathematically combine, by means of a hybridization unit, the information provided by an inertial positioning unit and the information provided by a satellite-based positioning receiver to reap the advantages of both types of information. An inertial positioning unit is commonly called an INS system ("Inertial Navigation System"). It is placed aboard the mobile body and comprises a set of inertial sensors (gyrometric sensors and accelerometric sensors). It is able to provide positioning data continually, furthermore these data are precise in the short term. On the other hand these data drift over the long term (under the influence of sensor defects).

An exemplary method for determining positions and for monitoring their integrity is described in patent application WO2008040658 filed by the applicant. In this method, the hybridization is carried out by a Kalman filter. The Kalman filter receives the position and speed points provided by the inertial measurement unit and the positioning measurements (pseudo-distance and pseudo-speed) provided by the satellite-based positioning unit. (one speaks of tight or satellite axis based hybridization), models the evolution of the errors of the inertial platform and delivers the a posteriori estimate of these errors which serves to reset the inertial platform's positioning and speed point. The hybridization is carried out in closed loop.

A method for monitoring the integrity of the position measurement calculates continually protection radius associated with the measurement of position of the mobile body. The performance of a position measurement protection radius calculated by a method of this type is generally similar to the performance of the protection radius for a device of the GNSS type (generally several hundred meters with a probability that the position error exceeds the protection radius without an alarm being dispatched of the order of $10^{-5}$ to $10^{-7}$ $h^{-1}$).

Hybrid methods reap the advantages of methods based on an inertial measurement unit and of those based on a GPS measurement unit; they exhibit, by virtue of the inertial positioning unit, the advantage of providing positions and protection radii continually, the positions not exhibiting any long-term drift, except in the case of loss of satellite information and the protection radii not exhibiting any abrupt jump in value upon loss of availability of the satellite information. Moreover the position information thus calculated exhibits similar precision to that of a GNSS positioning device when the satellite information is available.

Moreover, GNSS augmentation methods of the GBAS or SBAS type are known, based on one or more ground stations, able to identify the errors in the information provided by satellites and to provide an augmented satellite-based positioning unit aboard the aircraft with individual corrections on the signals emitted by the satellites.

Augmentation methods make it possible to provide position information of better precision than the information arising from a satellite-based positioning unit and to monitor the integrity of these measurements by affording access to small protection radii (conventionally decametric), with an integrity level defined by the system (probability that the position error exceeds the protection radius without an alarm being dispatched—conventionally of the order of $10^{-5}$ to $10^{-7}\,h^{-1}$).

The SBAS ("Space-Based Augmentation System") augmentation method relies on an off--board augmentation system disposed on the ground comprising interlinked reference stations on the ground, which receive the information emitted by the satellites, determine the errors in this information as well as the associated corrections. The corrections and the information on the validity are dispatched to geostationary satellites which transmit them to the on-hoard augmented positioning unit. The GBAS ("Ground Based Augmentation System") augmentation method operates for its part by virtue of an off-board augmentation system comprising a local station whose position is precisely known. The local station calculates the corrections and the validities and transmits them to the on-board positioning unit, for example, by a radio-frequency method.

The positions and the integrity calculations arising from the augmentation methods may be momentarily unavailable when the information dispatched by the satellites is unavailable or when the augmentation system has failed. They may moreover be considered to be unavailable if they do not satisfy the required precision and integrity conditions.

More generally, positioning methods based on positioning devices are known, which are able to calculate positions and to monitor the integrity of said positions, with better precision and/or smaller protection radii than those arising from a hybrid device of the INS/GNSS type described hereinabove. The information arising from these devices may, just like that arising from the augmentation devices, be unavailable at certain moments.

SUMMARY OF THE INVENTION

The aim of the present invention is to propose a method for determining the position of a mobile body and for monitoring the integrity of the position measurement which exhibits at one and the same time the advantages of an INS/GNSS hybrid method and at one and the same time the advantages of an augmentation method or more generally the advantages of a positioning method generally exhibiting better performance than a hybrid method but possibly being unavailable momentarily.

More precisely, it is sought to propose a method and a system for determining the position of a mobile body and for monitoring the integrity of the position measurement which exhibits protection radii as small as an augmentation method for more generally as an aforementioned positioning device), which guarantees the integrity of the position measurements provided and which is able to provide position measurements and to monitor their integrity in a continuous manner.

For this purpose, the subject of the invention is a method for determining the position of a mobile body at a given instant and for monitoring the integrity of the position of said mobile body, said method comprising:
- a step of storing the position of said mobile body at the previous instant and an associated protection radius,
- a step of acquiring when it is available, intermediate position information arising from an intermediate positioning device and an intermediate protection radius associated with the intermediate position arising from said intermediate positioning device,
- a step of acquiring information about hybrid speed and a hybrid speed protection radius associated with the hybrid speed determined by an INS/GNSS hybridization unit,
- a step of determining a sustained position at the given instant by adding, to the position of the mobile body at the instant preceding the given instant, the integral of the hybrid speed between the previous instant and the given instant,
- a step of determining the sustained protection radius associated with the sustained position by adding to the position protection radius of the previous instant, the integral of the hybrid speed protection radius between the previous instant and the given instant,
- a step of determining a best position at the given instant, the best position being:
when the information arising from the intermediate positioning device is available, the position associated with a best protection radius, the best protection radius being chosen by comparing, as a function of a predetermined selection criterion, the intermediate protection radius with the sustained protection radius at the given instant,
when the information arising from the intermediate positioning device is unavailable, the sustained position at the given instant.

The method according to the invention can also feature one of the following characteristics taken alone or in combination:
the hybridization unit implements a resetting method based on the independence of the faults affecting the various satellites,
the selection criterion consists in identifying as being the best protection radius, the smallest protection radius from among the intermediate protection radius associated with the intermediate position and the sustained protection radius associated with the sustained position,
the step of acquiring the hybrid speed protection radius is preceded by a step of determining, via the hybridization unit, a hybrid speed horizontal (and/or vertical) protection radius of hybrid speed, comprising the following steps:
determination of a hybrid speed auxiliary horizontal (and/or vertical) protection radius, under a hypothesis termed H1, that one of the raw measurements, is erroneous,
determination of a hybrid speed auxiliary horizontal (and/or vertical) protection radius under a hypothesis termed H0, that none of the raw measurements, is erroneous,
determination of the hybrid speed horizontal (and/or vertical) protection radius as a maximum of the hybrid speed auxiliary horizontal (and/or vertical) protection radii, the determination of the auxiliary hybrid speed horizontal (and/or vertical) protection radii being based on a determination of a radius of a circle enveloping a confidence ellipse in a horizontal (and/or vertical) plane and the confidence ellipse is determined on the basis of a variance/covariance matrix and of a sought-after probability value.

The subject of the invention is also a global system intended to be installed aboard a mobile body, said global system comprising:
- a sub-system able to implement the method according to the invention,
- an inertial measurement unit delivering inertial information,
- a satellite-based positioning receiver receiving signals from a constellation of tracked visible satellites and delivering raw data, a hybridization unit delivering information about hybrid speed and about hybrid speed protection radius on the basis of inertial information delivered by the inertial measurement unit and about raw information delivered by the satellite-based positioning receiver;

an intermediate positioning device delivering information about intermediate positions and about associated intermediate protection radii.

The global system can also feature the following characteristics taken alone or in combination:

the intermediate positioning device is an augmented positioning device, the mobile body is an aircraft.

The method according to the invention makes it possible to obtain position information that is more efficacious in terms of protection radius and availability than an augmentation system alone or than a conventional hybridization unit. Moreover this method continually monitors the integrity of the information provided. It is said that the position measurements provided by the method are always guaranteed for a given integrity level.

Furthermore, the positions of the positioning device are sustained with very good precision, by virtue of the hybrid speed. Moreover, the position and the protection radius that are calculated by following the method according to the invention are a sustained position and a sustained position protection radius rather than a hybrid position and position protection radius when the information arising from the positioning device is unavailable or has deteriorated. Thus the positions and the position protection radius that are provided by the method according to the invention are better (in terms of protection radius) than the hybrid values. Indeed, they are initialized on the values arising from the intermediate positioning device which exhibits, before deterioration or unavailability, better performance than the hybrid device in terms of protection radius.

Moreover, the method according to the invention makes it possible to provide positions utilizing (by way of the hybrid speed which exhibits good performance) the hybridization of the INS/GNSS type even in the case of loss of the augmentation or more generally of the intermediate positioning device.

BRIEF DESCRIPTION OF THE DRAWINGS

Other characteristics and advantages of the invention will become apparent on reading the detailed description which follows, given by way of nonlimiting example and with reference to the appended drawings in which.

Across the figures, the same elements are labeled by the same references.

DETAILED DESCRIPTION

Figure 1:
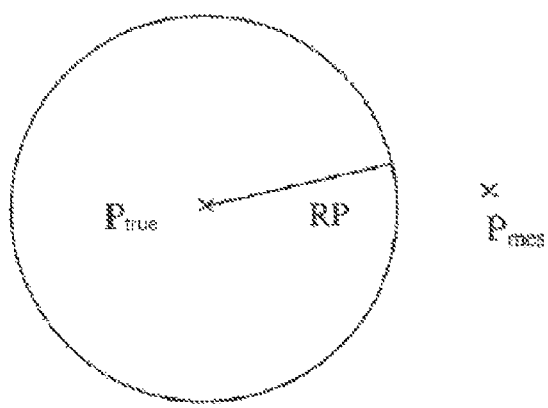
FIG. 1, already commented on, represents an exemplary protection radius.
Figure 2:
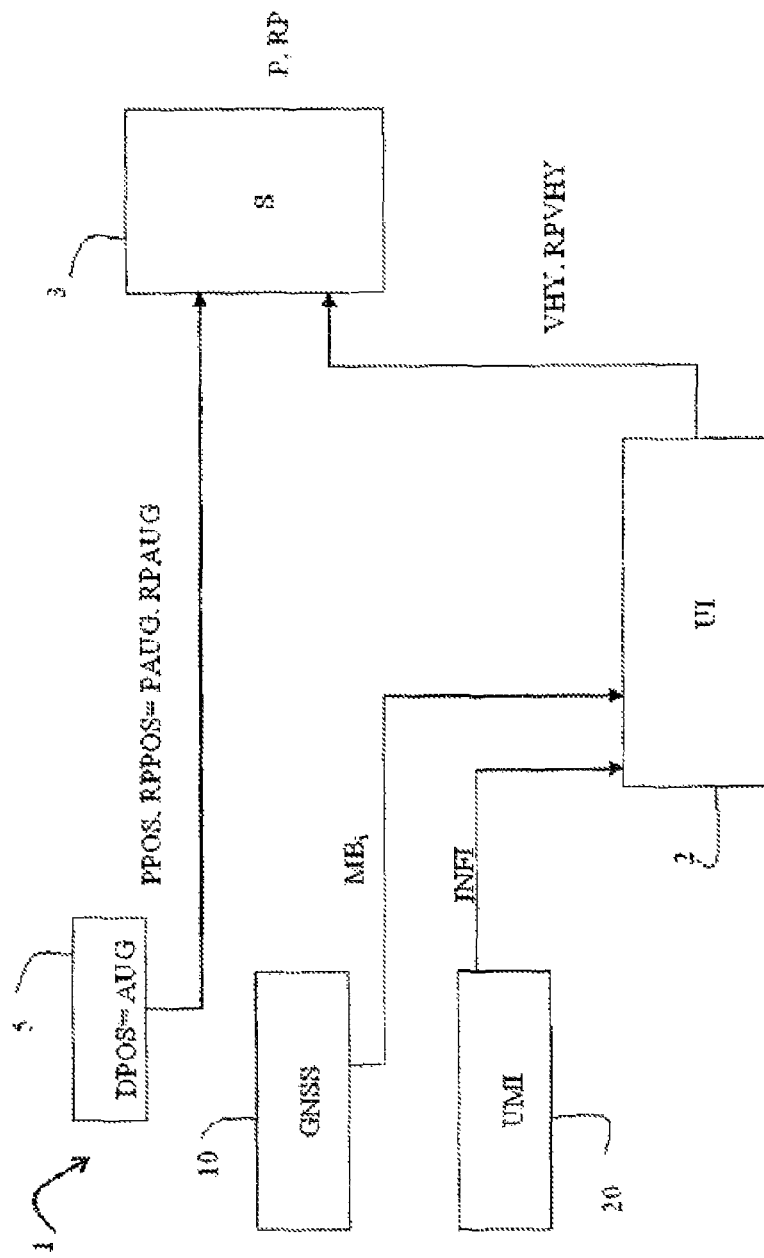
FIG. 2 schematically represents a global system for determining the position of a mobile body and for monitoring the integrity of the position according to the invention.

In FIG. 2 has been represented a global system 1 in which a method for determining the position of a mobile body and for monitoring the integrity of the position at a given instant according to the invention, has been implemented.

The global system 1, intended to be installed on the mobile body, for example an aircraft, comprises a GNSS satellite-based positioning receiver, 10, receiving signals from a constellation of N tracked visible satellites. The GNSS satellite-based positioning receiver, 10, delivers raw measurements $MB_i$ of signals emitted by the satellites, i denoting a satellite index lying between 1 and N. The global system also comprises an intermediate positioning device DPOS, 5, which calculates information about position and vertical protection radii and dispatches it to a sub-system S, 3. This intermediate positioning device is able to calculate positions exhibiting, preferably, better protection radii than an INS/GNSS hybrid device but which may possibly be unavailable at certain moments (in the case of a fault or for example when this information does not satisfy a predetermined integrity condition). Furthermore, the quality of the information provided by this device in terms of protection radius may be impaired at certain moments. One is dealing, for example, with positioning devices based on an instantaneous image ("snapshot") receiver or with a device able to provide a position in a precise and non-ambiguous manner by passing above a precise point.

For greater clarity, this positioning device will be called an intermediate positioning device calculating intermediate positions PPOS and horizontal and/or vertical protection radii associated with the intermediate position $RP_h POS$ and/or $RP_v POS$.

In the embodiment represented in FIG. 2, the intermediate positioning device is an augmented positioning device aboard the aircraft able to receive, when they are available, signals from the constellation of N tracked visible satellites and, when they are available, corrections CON, not represented, provided by an off-board positioning system. The intermediate positioning device DPOS, 5, is for example of the SEAS or GBAS type. As a variant, the augmented positioning system receives the corrections CON and raw information originating from the GNSS satellite-based positioning receiver.

In this embodiment, the intermediate positions PPOS and the vertical $RP_v POS$ and/or horizontal $RP_h POS$ intermediate protection radii are augmented positions and protection radii, that is to say it is information calculated on the basis of corrected raw satellite information by taking into account the corrections arising from the off-board augmentation system. The information arising from an on-board augmented positioning device is available only when the satellite information is available and when the on-board and off-board augmented positioning devices are operating.

The global system 1 comprises an inertial measurement unit UMI, 20, comprising gyrometers and accelerometers, not represented, and delivering inertial information INFI in the form of increments of angles delivered by gyrometers and speed increments delivered by the accelerometers. The global system 1 also comprises a hybridization unit UI, 2, receiving the inertial information INFI delivered by the inertial measurement unit UMI, 20, and the raw information $MB_i$ delivered by the GNSS satellite-based positioning receiver, 10. The hybridization unit UI, 2, is of the INS/GNSS type. Stated otherwise, it mathematically combines the information provided by an inertial measurement unit and the information provided by a satellite-based positioning receiver so as to calculate hybrid speeds, at each given instant t.

The hybridization unit UI, 2, delivers measurements of hybrid speed VHY and of hybrid speed vertical $RP_v VHY$ and/or horizontal $RP_h VHY$ protection radii associated with the hybrid speed measurements VHY.

The hybridization unit UI, 2, is able to provide hybrid speed protection radii $RP^v VHY$, $RP_h VHY$ generally of the order of a few $10^{-2}$ m/s with a probability that the hybrid speed error exceeds the protection radius without an alarm being dispatched of the order of $10^{-5}$ to $10^{-7}$ h$^{-1}$.

An exemplary hybridization unit UI, 2, will now be described, together with a method of calculation, according to the present invention, of the hybrid speed protection radius RVHY (τ) by the hybridization unit or optionally by the sub-system, 3. The hybridization unit UI, 2, is of the type of that described in patent application WO2008040658. It comprises:
- a hybridization Kalman filter,
- a bank of N secondary filters,
- a virtual platform, receiving the information delivered by the inertial measurement unit,
- a calculation module.

The virtual platform produces hybrid positioning and speed points, PPVI constituting respectively a hybrid position and a hybrid speed. The output of the hybrid unit UI, 2, comprises hybrid speeds delivered by the virtual platform as well as hybrid speed horizontal and vertical protection radii.

Advantageously the virtual platform employs barometric altitude measurements to avoid drifting of the hybrid position along a vertical axis.

The hybridization Kalman filter estimates the errors made in the inertial positions PPVI, it produces:
- a state vector VE corresponding to the errors of the hybrid system, obtained by observing the discrepancies between the inertial positioning and speed points PPVI and the corresponding raw measurements MB;
- a variance/covariance matrix, MHYP of the error made in the estimation of the state vector VE,
- a hybrid correction which comprises an estimation of the state vector VE, The description of the arrangement and functions of the Kalman filter and secondary filters is effected in patent application WO2008040658, notably the resetting method implemented by the hybridization unit which corrects the hybrid positioning and speeds values on the basis of the satellite data. The resetting method is able to correct the speed errors due to the defects of the inertial sensors and due to the defects affecting the information provided by the satellites by estimating the errors made in the inertial positions PPVI on the basis of the satellite data and by excluding the faulty satellites so as to provide information exhibiting good precision. For this purpose, the hybridization unit comprises several Kalman filters in parallel, a main filter working on the whole set of satellites in view and secondary filters working with all the satellites in view, except one. This architecture makes it possible to ensure that one of the secondary filters has not undergone the influence of a faulty satellite, if any. The resetting method is based on the fact that the faults affecting one satellite are independent of faults affecting the other satellites. It operates only when a fault with one satellite does not have any influence on the operation of the other satellites. As a variant, the resetting method corrects the hybrid positions and speeds by estimating the discrepancy between the inertial positions and the positions calculated on the basis of the satellite information and thereafter compensates for the discrepancy between these values continually.

The calculation module receives the information about hybrid speed and the variance/covariance matrix and determines values of hybrid speed protection radii. This method of calculation is similar to that which is implemented to calculate the position protection radii in patent application WO2008040658 but they are calculated on the basis of the hybrid speed instead of being calculated on the basis of the hybrid position. The calculation method described is summarized hereinbelow, in its application for the calculation of the hybrid speed horizontal protection radius. The calculation of a hybrid speed vertical protection radius is similar and will not be described.

An auxiliary intermediate hybrid speed protection radius $RP_h VHY_{H0}$ in the absence of any satellite fault is evaluated, a hypothesis commonly denoted $H_0$, according to which none of the raw measurements is erroneous. This intermediate protection radius is related directly to the variance of the speed and to the probability $P_{ni}$ that this error exceeds the protection radius. This is the coefficient of the diagonal of the variance/covariance matrix which corresponds to the measured quantity (here the speed). The standard deviation σ is the square root of this variance and is therefore deduced from the matrix P.

An auxiliary hybrid speed horizontal protection radius $RP_h VHY_{H1}$ is determined under the hypothesis termed H1, according to which one of the raw measurements MBi (originating from a satellite i) is erroneous, by the maximum separation scheme (this calculation is described in patent application WO2008040658).

The hybrid speed horizontal protection radius is determined as a maximum of the hybrid speed auxiliary horizontal protection radii $RP_h VHY_{H0}$ and $RP_h VHY_{H1}$.

The determination of the maximum is based on the determination of a circle enveloping a confidence ellipse in a horizontal plane. The confidence ellipse is determined on the basis of the variance/covariance matrix of the hybrid speed and of a sought-after probability value. This calculation is described in patent application WO2008040658.

Advantageously, the determination of the auxiliary horizontal protection radius is based on a desired false alarm probability value and on a desired missed detection probability value. Advantageously, the determination of the hybrid speed auxiliary horizontal protection radius $RP_h VHY_{H0}$ is based on a desired missed detection probability value and on a value of probability of occurrence of an undetected satellite defect.

The global system 1 furthermore comprises a sub-system S, 3, installed on the mobile body, which implements the method according to the invention. For this purpose, it effects the acquisition of the information of hybrid speed VHY, and of hybrid, speed protection radius RPVHY. The sub-system S, 3, also acquires the information, when the latter is available, of intermediate position PPOS and of intermediate protection radius RPPOS associated with the intermediate position PPOS.

The hybrid speed protection radii RPVHY are, either the hybrid speed horizontal, or vertical, protection radii, or a combination of the horizontal and vertical protection radii. In the latter case, the acquisition of the protection radii of the hybrid speed protection radii RPVHY are preceded by a step of acquiring the horizontal and/or vertical protection radii and by a step of calculating the combination of these two radii via the hybridization unit or the sub-system. Likewise, the position intermediate protection radii are, either the horizontal, or vertical, intermediate position protection radii or a combination of the horizontal and vertical protection radii. One chooses vertical protection radii when it is desired to land and have efficacious position measurements in the vertical direction, horizontal radii when it is desired to navigate in a narrow zone in the horizontal direction (for example between two mountains), and combinations of vertical and horizontal protection radii, when it is desired to weight the importance of these respective radii as a function of the flight configuration.

On the basis of these data, the sub-system 3 determines the position P(t) of a mobile body and monitors the integrity of this position by calculating at least one position protection radius RP(t) associated with the position P(t), for a given integrity level.

The method according to the invention, implemented by the sub-system S, 3, is as follows: at the initial instant t=0, the initial position of the mobile body and the position protection radius RP (t=0) are initialized to the respective values of the intermediate position PPOS(t=0) and of the intermediate position protection radius RPPOS(t=0). In order for the method according to the invention to begin, it is necessary to effect the acquisition of the position value and protection radius value arising from the intermediate positioning device.

Let us assume that the position protection radius RP(t-Δt) and the associated position P(t-Δt) at an instant t-Δt preceding the given instant by a time interval Δt are known. To determine the position of the mobile body at a given instant t, the position which is associated with the best protection radius at this instant is determined.

For this purpose, a sustained position PI (t) is determined by adding, to the position of the mobile body P(t), the integral of the hybrid speed between the previous instant t-Δt and the given instant t:

$$PI(t)=P(t-\Delta t)+\int_{\tau=t-\Delta t}^{\tau=t}VHY(\tau)d\tau$$

The sustained position protection radius RPI(t) associated with the sustained position PI(t) is also determined. This radius is obtained by adding to the protection radius RP(t) of the previous instant, the integral of the hybrid speed protection radius RPVHY(t) between the previous instant t-Δt and the given instant t:

$$RPI(t)=RP(t-\Delta t)+\sim_{\tau=t-\Delta t}^{\tau=t}RP\ VHY(\tau)d\tau$$

The sustained position protection radius RPI(t) and the intermediate position protection radius RPPOS(t) are thereafter compared, as a function of a predetermined selection criterion.

Preferably, the selection criterion consists in considering the best protection radius to be the smallest one.

The position P(t) calculated by the device according to the invention is the best position in terms of protection radius. Stated otherwise, it is the one which has the best protection radius.

If the information arising from the intermediate positioning device is available, the position P(t) provided by the device according to the invention is the sustained position PI(t).

Note that the hybrid speed (derived from the hybrid position) provided by the hybridization unit UI, 2, is very precise (the error in the speed is conventionally a few cm per second) since on the one hand, the errors in the speed information arising from the satellites are generally very small, the satellite position error varying very slowly, on the other hand, in the case of a loss of satellite information, the errors in the hybrid speeds deteriorate very gradually, on account of the nature of the inertial information, When the information arising from the intermediate positioning device deteriorates, the intermediate position protection radius increases for a given integrity level. The position arising from the intermediate positioning device is said to be less efficacious in terms of protection radius. If the deterioration or the loss of information is due to a loss of satellite information, the hybrid information also deteriorates (but slowly). On the other hand if the deterioration or the unavailability is due to a fault with the intermediate positioning device, the quality of the hybrid information is unchanged.

Let us assume that in the embodiment in which the intermediate positioning device is an augmentation device, the augmentation device exhibits deterioration due to a deterioration in the satellite information onward of an instant of deterioration td. Before the deterioration, the position P(t) and the associated protection radius RP(t) of the mobile body, are respectively equal to the augmented position PAUG and equal to the augmented protection radius RPAUG at the same instant. Before the deterioration, the augmented position protection radius is smaller than the sustained position protection radius.

When the information arising from the augmentation device deteriorates, the augmented position protection radius increases in contradistinction to the protection radius associated with the hybrid speed. The position P(t) then becomes the sustained position PI(t) as soon as the augmented position protection radius exceeds the sustained protection radius RPI (t). Thus, the method according to the first embodiment of the invention provides position measurements whose protection radius, for a given integrity level, increases less quickly than the augmented position protection radius after deterioration of the augmentation device.

Moreover let us assume that the information arising from the satellites is lost. The augmented position protection radii are no longer available. The position calculated by the method according to the invention is the sustained position.

Consequently, when the intermediate positioning device provides better position information than the sustained position, the position calculated by the method according to the invention is the intermediate position and as soon as the intermediate positioning device provides worse information than the sustained position in terms of protection radius, the calculated position becomes the sustained position.

The monitoring of the integrity of the position P(t) calculated by means of the method according to the invention is carried out by calculating at least one protection radius RP(t) associated with the position. As the best position is the one which has the best protection radius, a protection radius is automatically calculated in the method according to the invention.

It is possible to calculate additional protection radii on the basis of the protection radii which have not been used by the sub-system, 3. If the best position is the intermediate position and if it has been determined on the basis of vertical protection radii, the horizontal protection radius is the horizontal intermediate protection radius dispatched to the sub-system S by the intermediate positioning device. If the best position is the sustained position and if it has been determined by the method according to the invention on the basis of vertical protection radii, the horizontal protection radius is the sustained horizontal protection radius. The sustained horizontal protection radius is calculated by adding to the horizontal protection radius of the previous instant, the integral of the horizontal speed protection radius between the previous instant and the given instant.

The implementation of the method according to the invention does not require any modification of the hybridization units or of the intermediate positioning devices. It is not necessary to provide a dedicated hybridization unit to implement the method according to the invention. A conventional hybridization unit and an intermediate positioning device of the prior art are supplemented only with a sub-system implementing the method according to the invention.

The method according to the invention is of particular interest when the intermediate positioning device is an augmentation device and when the hybrid unit implements a resetting method and when the latter is based on the independence of the faults affecting the various satellites. It is not in this case possible to use augmented GNSS measurements as input to the hybrid device since the augmented measurements are inter-correlated. Indeed, when the augmentation system exhibits a failure (for example, if it is based on a position of the reference stations whose value is erroneous or if there is an error during the transmission of the data, etc), this failure is passed on to the corrections carried out on the signals dispatched by the various satellites. By implementing the method according to the invention it is possible, without using augmented data as input to the hybridization unit, to benefit from the advantages of an augmentation device as well as of a hybrid device.

In addition to an aircraft, the mobile body is for example, a ship or a terrestrial vehicle.

The invention claimed is:

1. A method for determining the position (P(t)) of a mobile body at a given instant (t) and for monitoring the integrity of the position of said mobile body, comprising:
    storing the position of said mobile body (P(t–Δt)) at a previous instant (t–Δt) and an associated protection radius (RP(t–Δt)),
    acquiring when it is available, intermediate position information (PPOS) arising from an intermediate positioning device DPOS and an intermediate protection radius (RPPOSS) associated with the intermediate position (PPOS) arising from said intermediate positioning device DPOS,
    acquiring information about hybrid speed (VHY) and a hybrid speed protection radius (RPVHY) associated with the hybrid speed (VHY) determined by an INS/GNSS hybridization unit UI,
    determining a sustained position (PI(t)) at the given instant (t) by adding, to the position of the mobile body at the previous instant (P(t–Δt)), the integral of the hybrid speed (VHY) between the previous instant (t–Δt) and the given instant (t),
    determining the sustained protection radius (RPI(t)) associated with the sustained position by adding to the position protection radius (RP(t–Δt)) of the previous instant (t–Δt), the integral of the hybrid speed protection radius (RPVHY) between the previous instant (t–Δt) and the given instant (t),
    determining a best position at the given instant (t), the best position being:
    when the information arising from the intermediate positioning device is available, the position associated with a best protection radius, the best protection radius being chosen by comparing, as a function of a predetermined selection criterion, the intermediate protection radius (RPPOS) with the sustained protection radius (RPI) at the given instant,
    when the information arising from the intermediate positioning device is unavailable, the sustained position at the given instant,
    the position (P(t)) of the mobile body being the best position.

2. The method for determining the position (P(t)) of a mobile body at a given instant (t) and for monitoring the integrity of said position as claimed in claim 1, wherein the hybridization unit UI implements a resetting method based on the independence of the faults affecting the various satellites.

3. The method for determining the position (P(t)) of a mobile body at a given instant (t) and for monitoring the integrity of said position as claimed in claim 1, wherein the selection criterion consists in identifying as being the best protection radius, the smallest protection radius from among the intermediate protection radius (RPPOS) associated with the intermediate position (PPOS) and the sustained protection radius associated with the sustained position.

4. The method for determining the position (P(t)) of a mobile body at a given instant (t) and for monitoring the integrity of said position as claimed in claim 1, wherein the step of acquiring the hybrid speed protection radius is preceded by a step of determining, via the hybridization unit UI, a hybrid speed horizontal (and/or vertical) protection radius of hybrid speed, comprising the following steps:
    determination of a hybrid speed auxiliary horizontal (and/or vertical) protection radius, under a hypothesis termed H1, that one of the raw measurements, MBi is erroneous,
    determination of a hybrid speed auxiliary horizontal (and/or vertical) protection radius under a hypothesis termed H0, that none of the raw measurements, MBi is erroneous,
    determination of the hybrid speed horizontal or vertical protection radius as a maximum of the hybrid speed auxiliary horizontal or vertical protection radii, the determination of the auxiliary hybrid speed horizontal or vertical protection radii being based on a determination of a radius of a circle enveloping a confidence ellipse in a horizontal or vertical plane, and in that the confidence ellipse is determined on the basis of a variance/covariance matrix and of a sought-after probability value.

5. A global system intended to be installed aboard a mobile body, comprising:
    sub-system S able to implement the method as claimed in claim 1,
    an inertial measurement unit UMI delivering inertial information (INFI),
    a GNSS satellite-based positioning receiver receiving signals from a constellation of tracked visible satellites and delivering raw data (MBi),
    a hybridization unit UI delivering information about hybrid speed (VHY) and about hybrid speed protection radius on the basis of inertial information (INFI) delivered by the inertial measurement unit UMI and about raw information (MBi) delivered by the GNSS satellite-based positioning receiver;
    an intermediate positioning device DPOS delivering information hybrid intermediate positions (PPOS) and about associated intermediate protection radii (RPPOS).

6. The global system intended to be installed aboard a mobile body as claimed in claim 1, wherein the intermediate positioning device is an augmented positioning device.

7. The global system as claimed in claim 1, wherein the mobile body is an aircraft.

* * * * *